Sept. 25, 1934.  W. KOSSOWSKI  1,975,045

METHOD OF MAKING PIPE BENDS

Filed Oct. 5, 1931

W. Kossowski
INVENTOR

By Marks & Clerk
ATTYS.

Patented Sept. 25, 1934

1,975,045

UNITED STATES PATENT OFFICE 1,975,045

METHOD OF MAKING PIPE BENDS

Waclaw Kossowski, Warsaw, Poland

Application October 5, 1931, Serial No. 567,096
In Poland August 10, 1931

2 Claims. (Cl. 153—32)

Pipes are bent in a known manner by being filled with suitable material,—for example, sand,—the material in the interior of the pipe having the object of preventing the round cross-section of the pipe becoming oval or flattened.

Although these means are quite suitable for their purpose such a process has other disadvantages, for example the walls are considerably deformed, that is, the convex wall of the curve is stretched and the concave wall compressed. The known method of producing folded curves has brought a great improvement in the making of pipe bends by using the excess material at the concave side of the curve for the formation of folds. But at the same time, the presence of these folds causes a displacement of the neutral or central axis of the bent pipe towards the convex wall of the curve so that the stretching thereof is considerably diminished. This stretching of the convex wall of the curve however, always occurs and the smaller the radius of curvature the greater is the stretching. These are the results of the filling with sand.

In a bar subjected to a bending operation compressive stresses arise on one side and tensile stresses on the other side while there are no stresses in the center of the cross-section. This part of the cross-section is called the neutral axis. In a composite profile as in the present application wherein it is a question of an empty iron pipe and a wire rope provided at a certain distance therefrom, the profile of the pipe and the wire rope must be regarded as a unit. The tensionless fiber or neutral axis will not lie in the middle of the pipe but between the latter and the wire rope and will approach the latter according to the thickness.

When bending with such a device the compressive stresses are taken up by the pipe and the tensile stress by the wire rope. The wire rope will therefore be stretched to some extent during the bending operation. If the thickness of the wire rope is so selected that the neutral tensionless axis lies outside the cross-section of the pipe only compressive stresses can arise in the pipe according to the well known core theory and this is also the gist of the present invention because tensile stresses in the pipe and a weakening of the pipe walls are thereby prevented.

The invention is clearly illustrated in the accompanying drawing, in which:—

Figures 3, 4:
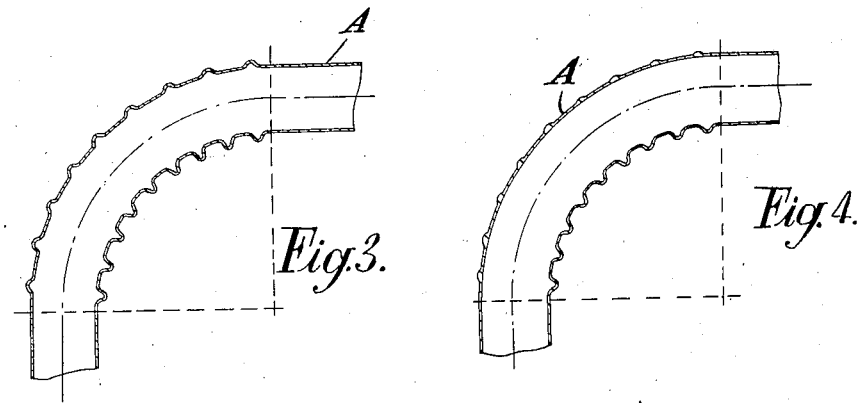
Figures 3 and 4 are longitudinal sections through the bent pipes.

According to the present invention, the pipe is bent without being filled with any material, that is, while quite empty, without the round cross-section becoming oval or flattened and without the walls of the curve being weakened. The concave wall of the curve becomes folded while the convex wall is slightly but noticeably compressed. This slight depression may, as desired, be directly formed into flat undulations so that the fold on the inner side of the curve passes into an undulation running round the pipe (Figs. 3 and 4).

Figure 1:
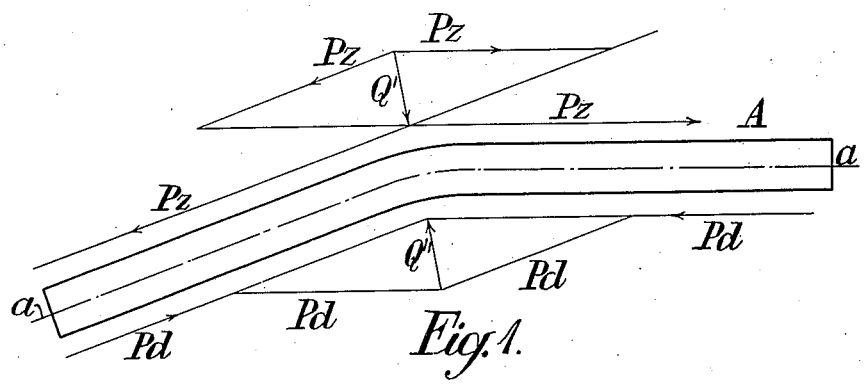
Figure 1 is a diagrammatical view of the forces arising when bending without sand filling, the line a—a representing the neutral or central axis.

Extended observations of the bending process in factories have led the inventor to the following considerations:

During the bending, pressure and tensile forces arise in the pipe as in a beam, which exist as re-action on opposite sides of the neutral axis of the material. The tensile forces $P_z$, as is seen from the parallelogram of forces (Fig. 1), produce a component $Q'$ which acts at right-angles on the wall of the pipe at the danger point. The compression forces $P_d$ in a similar manner give a component $Q''$ which is also directed against the pipe A at the danger point but on the opposite side. These two forces $Q'$ and $Q''$ press the pipe together and cause the flattening or the making oval of the round cross-section and may even destroy the article if there is no interior filling to take up these forces.

The problem therefore, was to remove these destructive forces or to make them harmless in order that a pipe could be bent without any filling.

Figures 2, 5:
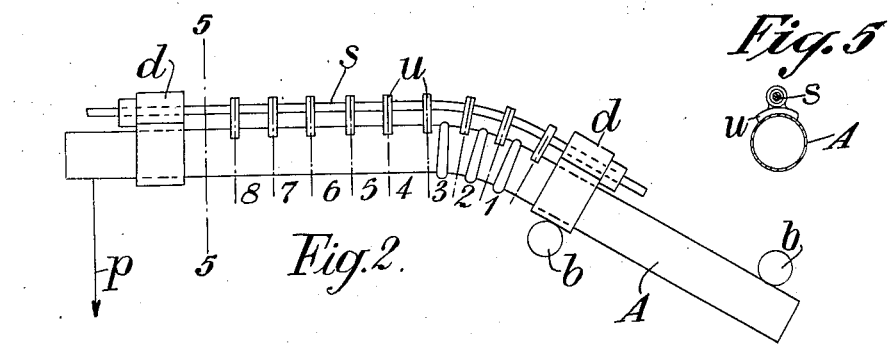
Figure 2 is a plan of the device when bending on the bending table.
Figure 5 is a cross-section on the line 5—5 of Figure 2.

Fig. 2 shows an example of carrying out the method. To the pipe A a flexible element, for example a steel wire rope $s$, is secured tightly between two strong clips $d$. The clips $d$ are immovably fixed to the pipe. Over the rope $s$, loose supports $u$ are drawn and distributed over the divisions 1 to 8 of the pipe. The pipe, as usual, lies on the bending table and is clamped between two bolts $b$. The pipe is now heated zonally about the first division by means of a gas burner or in any other suitable manner and when the required degree of heat is reached it is drawn slowly at the free end. In this way the pipe is bent over the first angle; then follow the second, third and further zones which are heated in this way and bent until the whole curve is finished. During this operation the heated zones of the pipe are compressed and a fold is produced round the pipe which projects considerably at the concave side of the curve but is fairly flat at the convex wall of the curve.

If, however, during the bending, the rope is released a few millimeters after each bending operation by means of a separate device, there will be no folds on the convex wall of the bend but only a scarcely noticeable thickening of the wall (Fig. 4).

As is now clear, the principal feature of the invention is that the wire rope $s$ which is made of suitable thickness and tightness, forms with the pipe a rigid system lying in the plane of bending. If now the whole system is bent in the direction of the force $p$ (Fig. 2), the whole cross-section of the pipe is only subjected to compressive stresses, the tensile stresses being taken up entirely by the rope which is stretched to some extent and which under certain circumstances takes the place of the neutral axis. It is, however, known that when a pipe is heated in zones and subjected to an axial pressure, the heated zone forms a fold which projects outwardly. Since the forces $P_z$ in the convex wall of the bend no longer occur, the detrimental force $Q'$ is absent, and the cross-section of the pipe remains round. For scientific clearness it may be remarked that the forces $P_z$ which are now taken up by the rope $s$, must form a component transverse force at the apex of the bending angle; this force, however, is taken up by the supports $u$ in such a manner that during each bending operation it is applied to two supports which are on the right and the left of the heated zone. The transverse pressure on the wall of the pipe is thus only half as large and does not act directly on the apex of the pipe and not in the plane of the danger point. Practical tests have completely confirmed this theory.

The advantages of this new method over the hitherto known bending methods are the following:

1, no weakening of the original wall of the pipe. 2, the possibility of producing curves of the greatest radius. 3, substantial cheapening of the manufacture (no filling of the pipe, small weight, economy of fuel). 4, the possibility of two modifications (Figs. 3 and 4).

What I claim is:—

1. A method of making pipe bends consisting in applying and fastening a flexible element to the outside of a pipe section so as to displace the neutral axis so that it lies between the flexible element and the outer wall of the pipe section, and alternately heating and bending the portions of said pipe sections.

2. A method of making pipe bends consisting in applying and fastening a flexible element to the outside of a pipe section so as to displace the neutral axis so that it lies outside the wall of the pipe section, heating and bending successive portions of the pipe section and releasing the flexible element a short distance after each bending operation for the purpose of preventing formation of folds on the convex wall of the pipe bend.

WACLAW KOSSOWSKI.